US012625018B2

(12) United States Patent
Sugiyama

(10) Patent No.: US 12,625,018 B2
(45) Date of Patent: May 12, 2026

(54) LOAD SENSOR

(71) Applicant: Proterial, Ltd., Tokyo (JP)

(72) Inventor: Yuta Sugiyama, Tokyo (JP)

(73) Assignee: Proterial, Ltd., Tokyo (JP)

( * ) Notice: Subject to any disclaimer, the term of this patent is extended or adjusted under 35 U.S.C. 154(b) by 260 days.

(21) Appl. No.: 18/508,500

(22) Filed: Nov. 14, 2023

(65) Prior Publication Data

US 2024/0159604 A1      May 16, 2024

(30) Foreign Application Priority Data

Nov. 16, 2022     (JP) ................................. 2022-183120

(51) Int. Cl.
*G01L 1/12*                (2006.01)
(52) U.S. Cl.
CPC ...................................... *G01L 1/12* (2013.01)
(58) Field of Classification Search
CPC ................................... G01L 1/12; G01L 1/125
See application file for complete search history.

(56) References Cited

FOREIGN PATENT DOCUMENTS

| | | |
|---|---|---|
| JP | 2020091222 A | 6/2020 |
| JP | 2020176879 A | 10/2020 |

OTHER PUBLICATIONS

Sugiyama et al., JP 2020-176879 A, Load Sensor, Oct. 2020, EPO Machine Translation, (Year: 2020).*

* cited by examiner

*Primary Examiner* — Erika J. Villaluna
(74) *Attorney, Agent, or Firm* — McGinn IP Law Group, PLLC

(57)          ABSTRACT

A load sensor is provided with a pressure-receiving core made of a magnetostrictive material on which a load to be detected acts, a non-pressure-receiving core made of a magnetic material concentrically arranged with the pressure-receiving core and on which the load to be detected does not act, a detection coil that generates a magnetic flux that passes through the pressure-receiving core by energizing, and a reference coil that, when energized, generates a magnetic flux that does not pass through the pressure-receiving core but passes through the non-pressure-receiving core.

7 Claims, 7 Drawing Sheets

LOAD SENSOR

CROSS-REFERENCE TO RELATED APPLICATIONS

The present application is based on Japanese patent application No. 2022-183120 filed on Nov. 16, 2022, the entire contents of which are incorporated herein by reference.

TECHNICAL FIELD

The present invention relates to a load sensor.

BACKGROUND OF THE INVENTION

Patent Literature 1 and Patent Literature 2 disclose a load sensor that uses a magnetostrictive material whose magnetic permeability changes according to the magnitude of an externally applied load, thereby detecting the magnitude of the externally applied load.

Each of the load sensors described in Literature 1 and 2 includes a detection shaft portion made of a magnetostrictive material on which a load acts, a reference shaft portion on which no load acts, and a plurality of load-detecting coils wound around the detection shaft portion and the reference shaft portion. In the load sensor described in Patent Literature 1, the detection shaft and reference shaft portions are aligned in the axial direction of the plurality of coils. In the load sensor described in Patent Literature 2, the detection shaft and reference shaft portions are aligned in the direction perpendicular to the axial direction of the plurality of coils.

CITATION LIST

Patent Literature 1: JP2020-91222A
Patent Literature 2: JP2020-176879A

SUMMARY OF THE INVENTION

In the load sensors described in Patent Literature 1 and Patent Literature 2, respectively, they may become larger in the arrangement direction of the detection shaft portion and the reference shaft portion.

The present invention was made in view of the aforementioned circumstances, and it is an object to provide a load sensor that can be downsized.

For the purpose of solving the above problem, one aspect of the present invention provides a load sensor, comprising:
    a pressure-receiving core made of a magnetostrictive material on which a load to be detected acts;
    a non-pressure-receiving core made of a magnetic material concentrically arranged with the pressure-receiving core and on which the load to be detected does not act;
    a detection coil that generates a magnetic flux that passes through the pressure-receiving core by energizing; and
    a reference coil that, when energized, generates a magnetic flux that does not pass through the pressure-receiving core but passes through the non-pressure-receiving core.

Advantageous Effects of the Invention

According to the present invention, it is possible to provide a load sensor that can be downsized.

DETAILED DESCRIPTION OF THE INVENTION

First Embodiment

The first embodiment of the present invention will be described with reference to FIGS. 1 to 4. The embodiments described below are shown as suitable concrete examples for implementing the invention, and although there are parts that specifically illustrate various technically preferred technical matters, the technical scope of the invention is not limited to concrete aspects.

Figure 1:
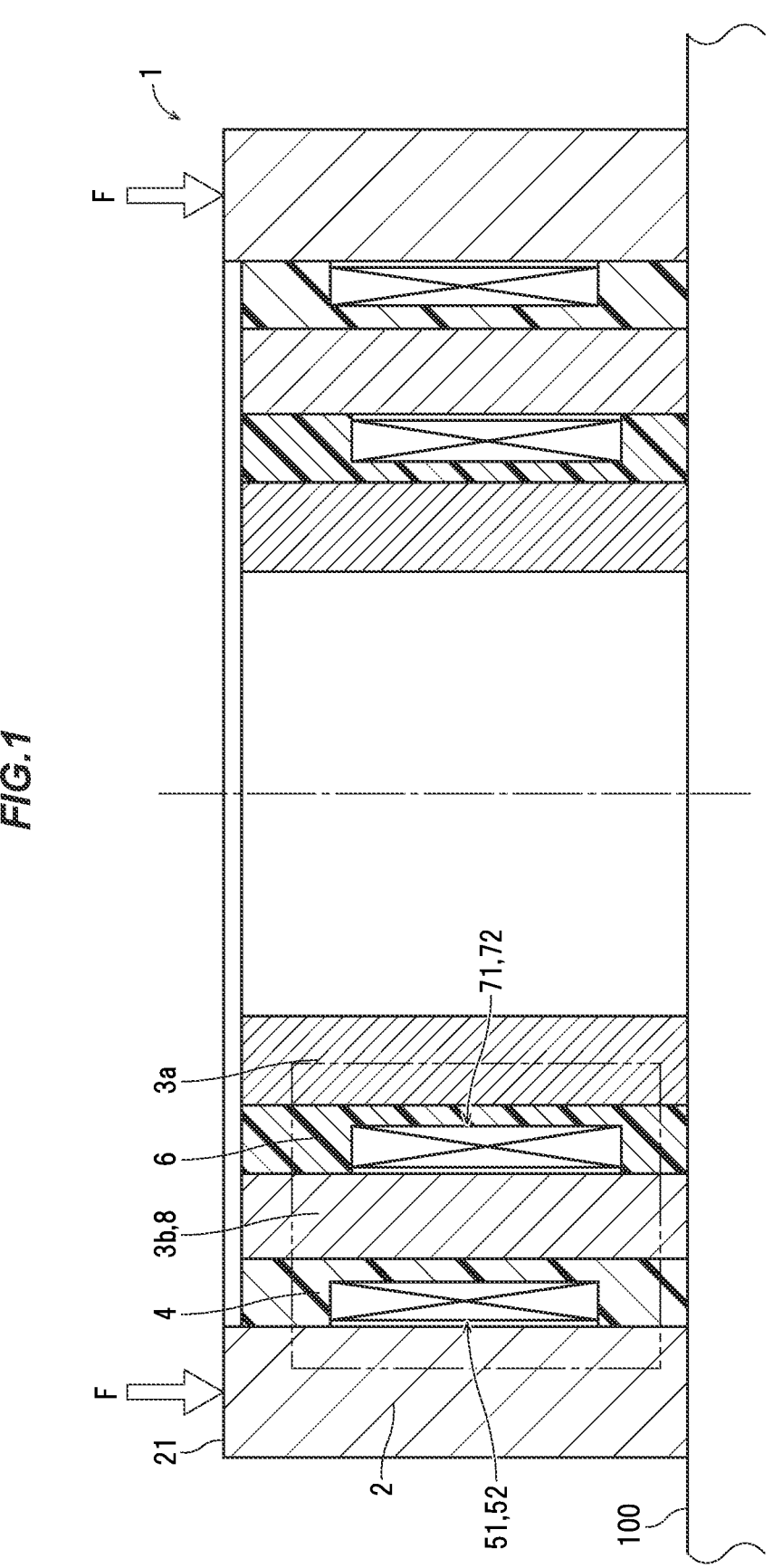
FIG. 1 is a cross-sectional view of a load sensor in the first embodiment of the present invention.
Figure 2:
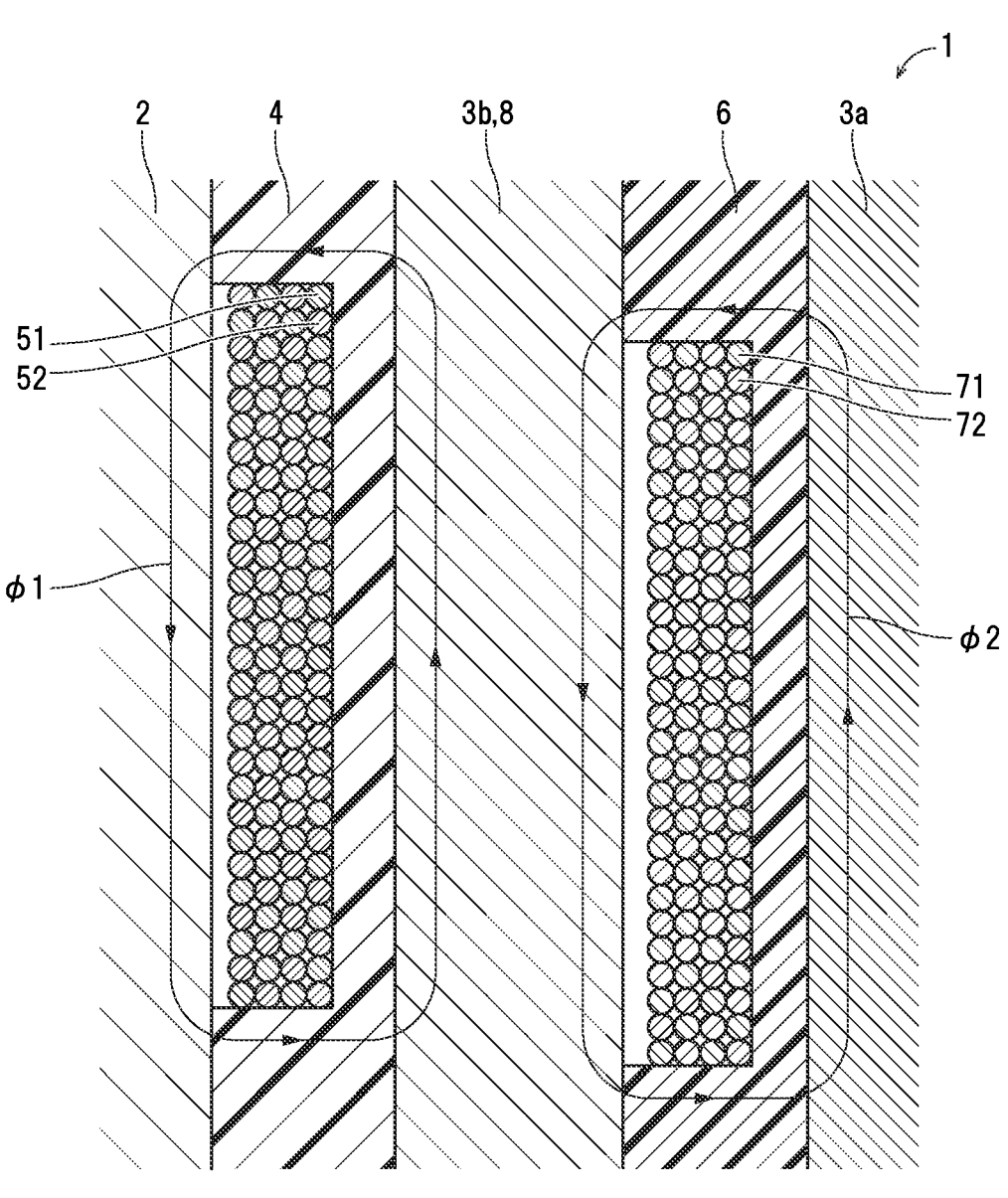
FIG. 2 is an enlarged view of an area shown by the double-dotted line in FIG. 1.
Figure 3:
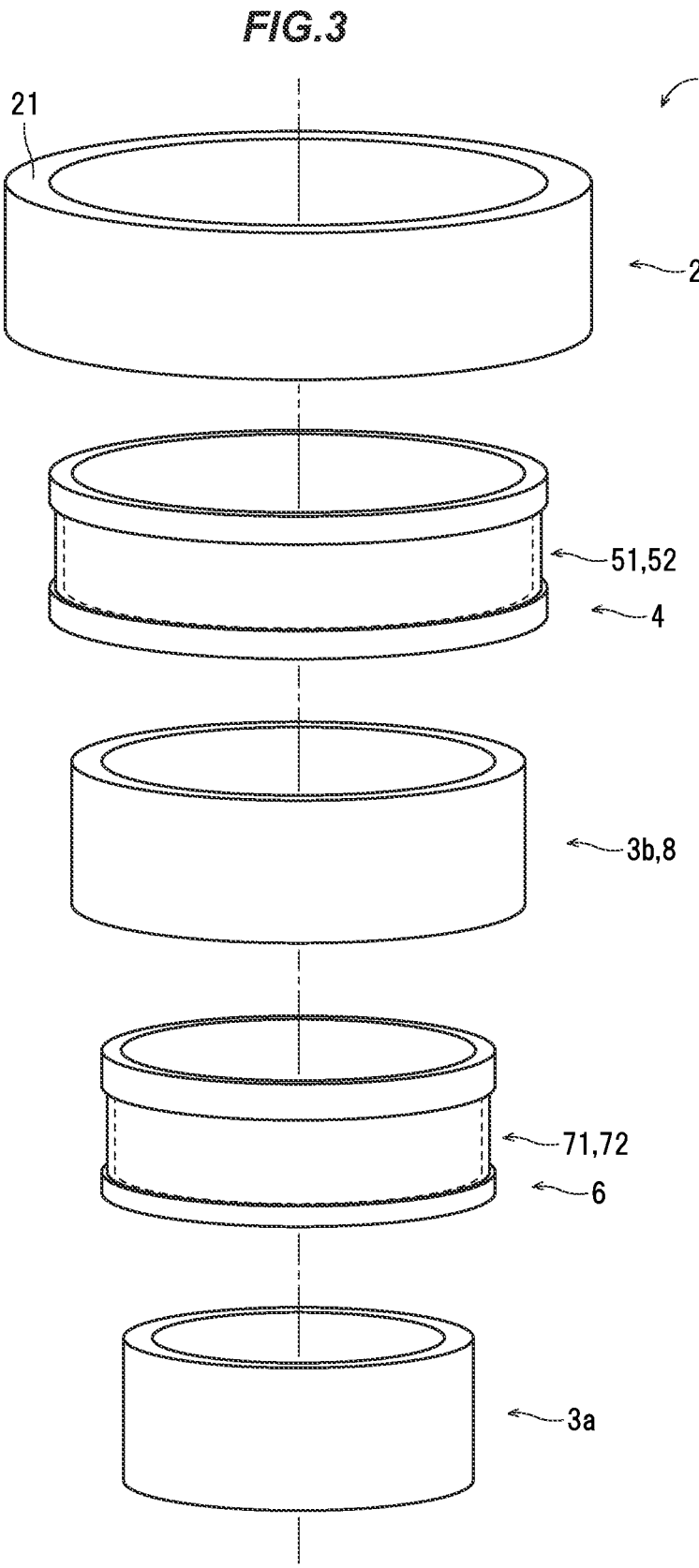
FIG. 3 is an exploded view of the load sensor in the first embodiment.

FIG. 1 is a cross-sectional view of the load sensor 1 in this embodiment. FIG. 2 is an enlarged view of an area shown by the two-dotted line of FIG. 1. FIG. 3 is an exploded view of the load sensor 1.

The load sensor 1 includes a pressure-receiving core 2, first and second non-pressure-receiving cores 3a, 3b, first and second detection coils 51, 52 wound around a detection bobbin 4, and first and second reference coils 71, 72 wound around a reference bobbin 6. The pressure-receiving core 2 is made of a magnetostrictive material and is the core on which the load to be detected (i.e., detection target) acts. The first and second non-pressure-receiving cores 3a, 3b are made of a magnetic material (specifically, soft magnetic material), are concentrically arranged with the pressure-receiving core 2, and are cores on which the load to be detected does not act. The first and second detection coils 51, 52 are coils that generate a magnetic flux $\varphi 1$ that passes through the pressure-receiving core 2 when energized. The first and second reference coils 71, 72 are coils that, when energized, generate a magnetic flux $\varphi 2$ that does not pass through the pressure-receiving core 2 but passes through the first and second non-pressure-receiving cores 3a, 3b.

The load sensor 1 is provided with, in order from an inner-periphery, the first non-pressure-receiving core 3a, the first and second reference coils 71, 72 wound around the reference bobbin 6, the second non-pressure-receiving core 3b, the first and second detection coils 51, 52 wound around the detection bobbin 4, and the pressure-receiving core 2. The first non-pressure-receiving core 3a, the reference bobbin 6, the second non-pressure-receiving core 3b, the detection bobbin 4, and the pressure-receiving core 2 are respectively formed in a cylindrical shape and concentrically arranged. "Concentrically" refers to the state in which a plurality of members are arranged in layers in the radial direction, and is not limited to the case in which the centers of each member are coincident with each other. The load sensor 1 in this embodiment is attached to a mounting object 100 and is used to detect a load F acting on the pressure-receiving core 2 from the opposite side to the mounting object 100. The respective parts of the load sensor 1 will be described in detail below, starting with the parts located on the inner periphery.

The first non-pressure-receiving core 3*a* comprises a magnetic material as described above. In this embodiment, the first non-pressure-receiving core 3*a* is composed of the same material as the pressure-receiving core 2 (i.e., the magnetostrictive material described below), and its magnetic permeability is equivalent to that of the pressure-receiving core 2. The first non-pressure-receiving core 3*a* may be made of a different material from the pressure-receiving core 2, or may be made of a magnetic material other than the magnetostrictive material. In this embodiment, the first non-pressure-receiving core 3*a* is shown to be cylindrical, but it may be a solid member formed in a cylindrical shape or the like.

A surface on the side of the first and second reference coils 71, 72 in the first non-pressure-receiving core 3*a* (an outer periphery surface of the first non-pressure-receiving core 3*a* in this embodiment) is shot-peened. This allows martensitic transformation (non-diffusional transformation) to occur in the residual austenite near the first and second reference coils 71, 72-side surface in the first non-pressure-receiving core 3*a*, resulting in a decrease in non-magnetic austenite and an increase in ferromagnetic martensite in the first non-pressure-receiving core 3*a*. As a result, non-magnetic austenite is reduced and ferromagnetic martensite is increased in the first non-pressure-receiving core 3*a*. As a result, the magnetic area of the first non-pressure-receiving core 3*a* is increased. The reference bobbin 6 is arranged to enclose the first non-pressure-receiving core 3*a* from the outer periphery.

The reference bobbin 6 is made of, for example, an electrically insulative material. The first and second reference coils 71, 72 are wound around an outer periphery surface of the reference bobbin 6. The reference bobbin 6 may not be used, and the first and second reference coils 71, 72 may be wound directly around the outer periphery of the first non-pressure-receiving core 3*a*. However, from the viewpoint of increasing the accuracy of load detection, it is not desirable for the first and second reference coils 71, 72 to be in direct contact with the first non-pressure-receiving core 3*a*, and it is preferred to use the reference bobbin 6 to form a predetermined gap between them.

The first and second reference coils 71, 72 are wound in the same direction and energized in the same direction as each other. In FIG. 2, the first and second reference coils 71, 72 are distinguished from each other by reversing the direction of hatching. In FIG. 2, an example is shown in which the first and second reference coils 71, 72 are wound around the reference bobbin 6 by bi-filer winding. Bi-filer winding is a winding method in which the same turns of each coil are wound in such a manner that they are aligned with each other. The first and second reference coils 71, 72 may be wound around the outer periphery surface of the reference bobbin 6 by layer winding instead of bi-filer winding. Layer winding is described below. The second non-pressure-receiving core 3*b* is arranged to cover the reference bobbin 6 on which the first and second reference coils 71, 72 are wound from the outer periphery.

The second non-pressure-receiving core 3*b* is arranged between adjacent coils in the radial direction (between the first and second reference coils 71, 72 and the first and second detection coils 51, 52 in this embodiment) and constitutes a yoke 8 on which both the magnetic fluxes φ1, φ2 generated by energizing each adjacent coil are formed. By providing the yoke 8, the magnetic paths of the magnetic fluxes φ1, φ2 are separated in the yoke 8, thereby suppressing the magnetic fluxes φ1, φ2 from interfering with each other. The yoke 8 also lowers the magnetic resistance of the magnetic paths in which the magnetic fluxes φ1, φ2 are generated, which facilitates improving the accuracy of load detection by the load sensor 1.

From the viewpoint of facilitating separation of the magnetic paths of the magnetic flux φ1, φ2 in the yoke 8, the magnetic permeability of the yoke 8 should be the same as or greater than the magnetic permeability of the first non-pressure-receiving core 3*a* and the pressure-receiving core 2, respectively. In this embodiment, the yoke 8 can be a pressed magnetic core made by compressing magnetic metal powder such as iron. It is also possible to omit the yoke 8 and make a gap (void) or the like between the reference bobbin 6 and the detection bobbin 4, for example. The detection bobbin 4 is arranged to cover the yoke 8 from the outer periphery.

The detection bobbin 4 is made of, for example, an electrically insulative material. The first and second detection coils 51, 52 are wound around the outer periphery of the detection bobbin 4. The first and second detection coils 51, 52 may be wound directly around the outer periphery of the yoke 8 without using the detection bobbin 4. However, from the viewpoint of increasing the accuracy of load detection, it is not desirable for the first and second detection coils 51, 52 to be in direct contact with the yoke 8, and the detection bobbin 4 should be used to form a predetermined gap between them.

The first and second detection coils 51, 52 are wound in the same direction and energized in the same direction as each other. The winding and energizing directions of the first and second detection coils 51, 52 may be the same as or opposite to the winding and energizing directions of the first and second reference coils 71, 72, but in FIG. 2, the case where they are the same is shown. In FIG. 2, the first and second detection coils 51 and 52 are distinguished from each other by reversing the direction of hatching. In FIG. 2, an example is shown in which the first and second detection coils 51, 52 are wound around the detection bobbin 4 by bi-filer winding. The first and second detection coils 51, 52 may be wound around the outer surface of the detection bobbin 4 by layer winding instead of bi-filer winding. Layer winding is described below. The pressure-receiving core 2 is arranged to cover the detection bobbin 4 on which the first and second detection coils 51, 52 are wound from the outer periphery.

The pressure-receiving core 2 is made of a magnetostrictive material as described above. The pressure-receiving core 2 can be made of steel material, for example, chrome steel or chrome molybdenum steel, more specifically, JIS standard SCr420H or SCM420H. The entire pressure-receiving core 2 may be carburized, quenched and tempered. This can increase the mechanical strength, including toughness, of the pressure-receiving core 2, and can suppress a decrease in load detection accuracy due to hysteresis in the pressure-receiving core 2. Although no load is applied to the first non-pressure-receiving core 3*a*, the same treatment may be applied to the first non-pressure-receiving core 3*a*.

A surface on the side of the first and second detection coils 51, 52 in the pressure-receiving core 2 (an inner periphery surface of the pressure-receiving core 2 in this embodiment) is shot-peened. This allows martensitic transformation (non-diffusional transformation) to occur in the residual austenite near the first and second detection coils 51, 52-side surface in the pressure-receiving core 2, resulting in a decrease in non-magnetic austenite and an increase in ferromagnetic martensite in the pressure-receiving core 2. This results in a reduction of non-magnetic austenite and an increase in ferromagnetic martensite in pressure-receiving core 2. As a result, the magnetic area of the pressure-receiving core 2 is increased, and the accuracy of load detection by the load sensor 1 is enhanced. Furthermore, the rigidity of the pressure-receiving core 2 can be increased by shot-peening the pressure-receiving core 2. This can suppress a decrease in the load detection accuracy due to hysteresis in the pressure-receiving core 2.

In this embodiment, the pressure-receiving core 2 is configured to receive the load F to be detected in the axial direction. The load F to be detected acts axially on the receiving surface 21 on the opposite side of the mounting object 100 in the pressure-receiving core 2 when the load sensor 1 is mounted on the mounting object 100. To facilitate the load acting on the receiving surface 21, the receiving surface 21 is located on the opposite side of the mounting object 100 to the first and second non-pressure-receiving cores 3*a*, 3*b* when the load sensor 1 is mounted on the mounting object 100. In this embodiment, each of the first non-pressure-receiving core 3*a*, the reference bobbin 6, the yoke 8 (i.e., non-pressure-receiving core 3*b*), the detection bobbin 4, and the pressure-receiving core 2 is mounted in such a manner that it contacts a flat spot on the mounting object 100 on the side of the mounting object 100, and the pressure-receiving core 2 is formed longer in the axial direction than each of the first non-pressure-receiving core 3*a*, the reference bobbin 6, the yoke 8, and the detection bobbin 4, in such a manner that the receiving surface 21 is positioned on the side opposite to the mounting object 100, with respect to the components other than the pressure-receiving core 2 constituting the load sensor 1.

Although the drawings are omitted, it is possible to realize a configuration in which the receiving surface 21 of the pressure-receiving core 2 is positioned on the opposite side to the mounting object 100 with respect to the components other than the pressure-receiving core 2, even if the axial length of the pressure-receiving core 2 is not longer than the axial lengths of the other parts of the load sensor 1, by making the portion facing the pressure-receiving core 2 in the mounting object 100 a ring-shaped (i.e., annular) convex portion, for example. Even in a configuration in which the pressure-receiving core 2 does not protrude in the axial direction in the load sensor 1, it is possible to realize a configuration in which the load F acts only on the pressure-receiving core 2, for example, by forming a convex portion on the member that applies the load F to the receiving surface 21 that contacts only the pressure-receiving core 2 among the components of the load sensor 1.

It is preferred that the pressure-receiving core 2 and the first and second non-pressure-receiving cores 3*a*, 3*b* be physically separated from each other in order to prevent the load F acting on the pressure-receiving core 2 from being transmitted to the first and second non-pressure-receiving cores 3*a*, 3*b*, which would reduce the accuracy of load detection. For example, at least one gap should be formed between the pressure-receiving core 2 and the detection bobbin 4, and between the detection bobbin 4 and the yoke 8. As long as the pressure-receiving core 2 and the first and second non-pressure-receiving cores 3*a*, 3*b* are physically separated, some of the parts comprising the load sensor 1 may be fixed to each other.

The positional relationship of the parts of the load sensor 1 can be fixed in the state in which the load sensor 1 is mounted on the mounting object 100. For example, in the state shown in FIG. 1, the positional relationship of each component of the load sensor 1 can be fixed by fixing the axial side of each component of the load sensor 1 on the mounting object 100 by adhesion or other means. In addition, for example, a configuration for positioning between parts of the load sensor 1 may be adopted by forming a flange extending in the radial direction on at least one of the reference bobbin 6 or the detection bobbin 4, and placing, fixing, etc. each part of the load sensor 1 on this flange.

In this embodiment, the length of the load sensor 1 is smaller in the axial direction than the maximum length in the direction perpendicular to the axial direction (in this embodiment, the diameter of the pressure-receiving core 2). This allows the load sensor 1 to be compactly formed in the axial direction.

Figure 4:
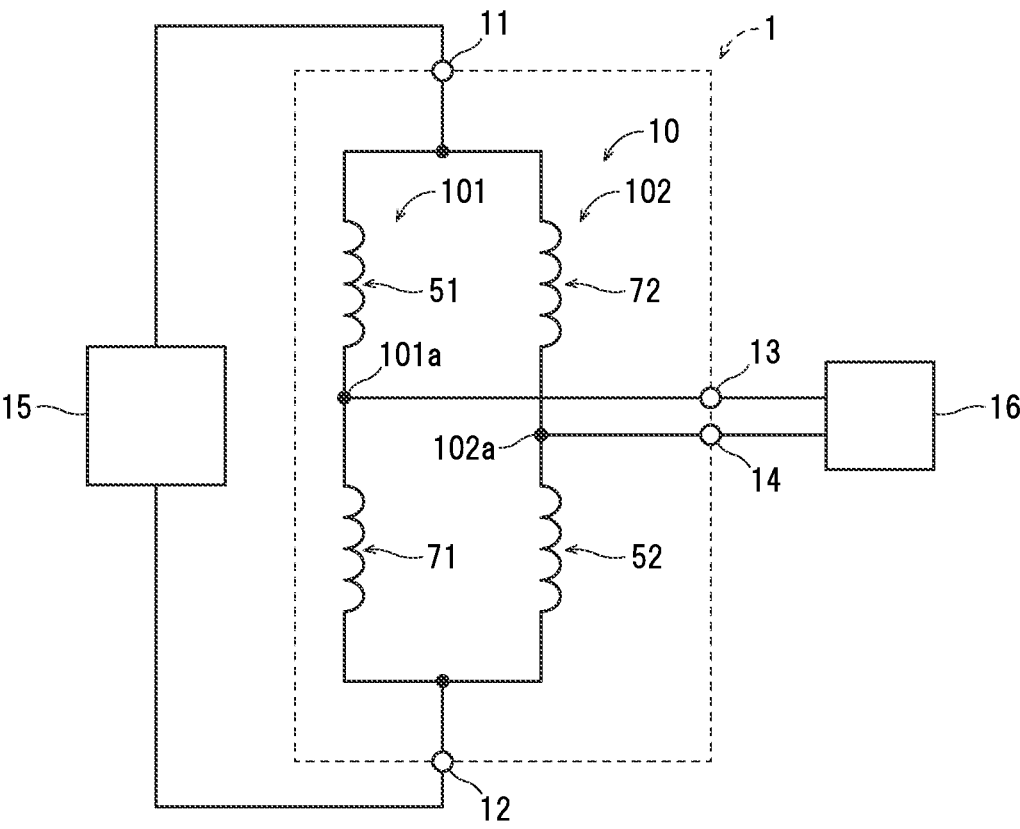
FIG. 4 is a circuitry diagram of the load sensor in the first embodiment.

Next, the circuit configuration of the load sensor 1 in this embodiment is described with reference to FIG. 4. FIG. 4 is a circuitry diagram of the load sensor 1 in this embodiment.

The first and second detection coils 51, 52 and the first and second reference coils 71, 72 form a bridge circuit 10. The bridge circuit 10 has a first series circuit 101 in which the first detection coil 51 and the first reference coil 71 are connected in series, and a second series circuit 102 in which the second reference coil 72 and the second detection coil 52 are connected in series. The first and second series circuits 101, 102 are connected in parallel. The first and second series circuits 101, 102 are connected to each other by the detection coil 51-side of the series circuit 101 and the reference coil 72-side of the second series circuit 102. An AC voltage is applied to electrodes 11, 12 at both ends of the bridge circuit 10 from an AC power supply 15 external to the load sensor 1.

A first intermediate point 101*a* between the first detection coil 51 and the first reference coil 71 in the first series circuit 101 is connected to a first output terminal 13, and a second intermediate point 102*a* between the second reference coil 72 and the second detection coil 52 in the second series circuit 102 is connected to a second output terminal 14. The first and second output terminals 13, 14 are connected to an external voltage-measuring unit 16, and the voltage between the first intermediate point 101*a* and the second intermediate point 102*a* is measured at the voltage-measuring unit 16.

By applying an AC voltage from the AC power supply 15 to the bridge circuit 10, current flows in the first and second detection coils 51, 52 and the first and second reference coils 71, 72, forming the magnetic fluxes φ1, φ2 (see FIG. 2). The magnetic flux φ1 generated by energizing the first and second detection coils 51, 52 is formed to pass through the pressure-receiving core 2 and the yoke 8, while the magnetic flux φ2 generated by energizing the first and second reference coils 71, 72 does not pass through the pressure-receiving core 2 but through the first non-pressure-receiving core 3*a* and the yoke 8.

The inductance of each coil comprising the bridge circuit 10 is designed to be equal when the load F is not acting on the pressure-receiving core 2. As a result, when the load F is not acting on the pressure-receiving core 2, no voltage is generated between the first intermediate point 101*a* and the second intermediate point 102*a*. On the other hand, when the load F is acting on the pressure-receiving core 2, the magnetic permeability of the pressure-receiving core 2 changes according to the magnitude of the load F, and the inductance of the first and second detection coils 51, 52 changes. As a result, the voltage between the first and second intermediate points 101*a*, 102*a* changes according to the magnitude of the load F acting on the pressure-receiving core 2, in such a manner that the magnitude of the load F acting on the pressure-receiving core 2 can be detected based on the voltage between the first and second intermediate points 101*a*, 102*a*. The voltage-measuring unit 16 may be provided with a differential amplifier circuit that amplifies the voltage between the first and second intermediate points 101*a*, 102*a* and a detection circuit that detects the output signal of the differential amplifier circuit in order to remove in-phase components and detect only differential components.

As mentioned above, in this embodiment, the first non-pressure-receiving core 3*a* and the pressure-receiving core 2 are made of the same material, and their magnetic permeability is equivalent to each other. As a result, the respective impedances of the first and second reference coils 71, 72, the first and second detection coils 51, 52 can be easily matched by, for example, adjusting the number of turns of each coil. Here, when the permeability of the first non-pressure-receiving core 3*a* and the pressure-receiving core 2 are equivalent to each other, this includes the case where they are designed to have the same permeability but slightly different due to manufacturing tolerances, etc.

The winding of the first and second reference coils 71, 72 on the outer periphery surface of the reference bobbin 6 and the first and second detection coils 51, 52 on the outer periphery surface of the detection bobbin 4 is not limited to bi-filer winding, but may be layer winding. Layer winding is a winding method in which multiple coils are alternately wound one layer at a time. For example, on the outer periphery of the reference bobbin 6, the first reference coil 71 is wound around the odd-numbered layer and the second reference coil 72 on the even-numbered layer, and on the outer periphery of the detection bobbin 4, the detection coil 51 is wound around the odd-numbered layer and the detection coil 52 on the even-numbered layer. In the case of layer winding, from the viewpoint of making the impedances of the first detection coil 51 and the second reference coil 72 equal to each other, and the impedance of the first reference coil 71 and the second detection coil 52 equal to each other, the layer positions of the first reference coil 71 and the second detection coil 52 should be the same. That is, for example, if the first detection coil 51 is wound around a first layer and a third layer, the second reference coil 72 should also be wound around the first layer and the third layer, and if the first reference coil 71 is wound around a second layer and a fourth layer, the second detection coil 52 should also be wound around and the second layer and the fourth layer.

Functions and Effects of the First Embodiment

In the load sensor 1 according to the present embodiment, the pressure-receiving core 2 and the first and second non-pressure-receiving cores 3*a*, 3*b* are concentrically arranged. This enables downsizing of the load sensor 1.

Also, at least one of the pressure-receiving core 2 or the non-pressure-receiving core (i.e., the first and second non-pressure-receiving cores 3*a*, 3*b*) has the yoke 8 that is positioned between adjacent coils in the radial direction (between the first and second reference coils 71, 72 and the first and second detection coils 51, 52 in this embodiment) of the plurality of coils comprising the first and second detection coils 51, 52 and the first and second reference coils 71, 72, and in which both the magnetic fluxes φ1, φ2 generated by energizing each adjacent coil are formed. Hence, the magnetic flux φ1 generated by energizing the first and second detection coils 51, 52 and the magnetic flux φ2 generated by energizing the first and second reference coils 71, 72 are less likely to interfere with each other, thereby reducing the load detection accuracy.

The magnetic permeability of the yoke 8 is greater than the magnetic permeability of the pressure-receiving core 2 and the first and second non-pressure-receiving cores 3*a*, 3*b* other than the yoke 8 (i.e., the pressure-receiving core 2 and the first non-pressure-receiving core 3*a*). Therefore, the interference between the magnetic flux φ1 generated by energizing the first and second detection coils 51, 52 and magnetic flux φ2 generated by energizing the first and second reference coils 71, 72 is more easily suppressed and the accuracy of load detection is improved.

The load F to be detected acts in the axial direction on the receiving surface 21 at one end of the pressure-receiving core 2 in the axial direction. Thus, by configuring the pressure-receiving core 2 to receive the load from the axial direction, the durability of the pressure-receiving core 2 can be improved.

When mounted on the mounting object 100, the receiving surface 21 is located on the opposite side to the mounting object 100 with respect to the first and second non-pressure-receiving cores 3*a*, 3*b*. Hence, it is easy to suppress the load of the detection object acting on the first and second non-pressure-receiving cores 3*a*, 3*b* while allowing the load F of the detection object to act on the pressure-receiving core 2 from the receiving surface 21. In this embodiment, since the axial length of the pressure-receiving core 2 is longer than the axial lengths of the first and second non-pressure-receiving cores 3*a*, 3*b*, it is easier to achieve a configuration in which the receiving surface 21 is located on the opposite side of the mounting object 100 to the first and second non-pressure-receiving cores 3*a*, 3*b*.

As described above, according to this embodiment, it is possible to provide a load sensor that can be miniaturized.

Second Embodiment

Figure 5:
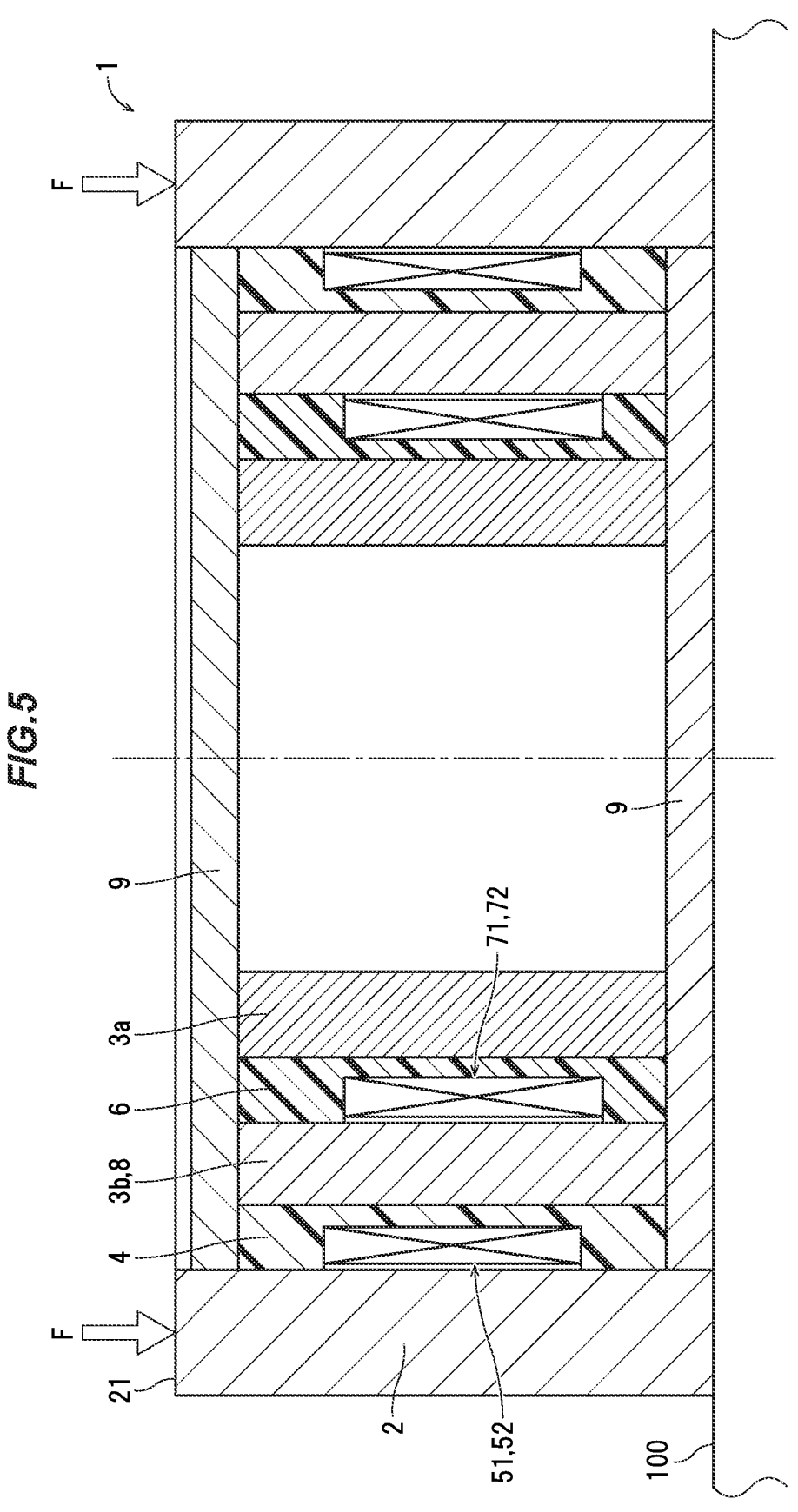
FIG. 5 is a cross-sectional view of the load sensor in the second embodiment.

FIG. 5 is a cross-sectional view of the load sensor 1 in this embodiment.

This embodiment has the same basic structure as the first embodiment but is designed to suppress an external magnetic flux from entering into the load sensor 1. If the external magnetic flux enters the load sensor 1, it will be difficult to accurately detect changes in the magnetic permeability of the pressure-receiving core 2 according to the magnitude of the load on the pressure-receiving core 2, and there is a concern that the accuracy of load detection may decrease. However, this embodiment eliminates such concerns.

In this embodiment sensor 1, a shield member 9 is arranged on at least one side of the first and second detection coils 51, 52 and the first and second reference coils 71, 72 in the axial direction. The shield member 9 is made of a material having a magnetic shielding effect. As a material having a magnetic shielding effect, for example, a conductor that generates eddy currents as magnetic flux passes through it can be employed, and both magnetic and non-magnetic materials can be employed. As an example, the shield member 9 can be made of ferrous metal such as permalloy.

In this embodiment, the shield members 9 are arranged inside each opening at both ends of the pressure-receiving core 2. The two shield members 9 are each formed in the form of a disc and are provided to close the two openings. For example, the shield members 9 may be circularly (i.e., annularly) formed with a through-hole that is connected to an inner space of the first non-pressure-receiving core 3*a*. In this embodiment, an example in which the shield members 9 are arranged on both sides of the first and second detection coils 51, 52 and the first and second reference coils 71, 72 in the axial direction respectively is shown, but for example, the shield members 9 may be arranged only on one side of the first and second detection coils 51, 52 and reference coils 71, 72 in the axial direction.

Each shield member 9 is unfastened to at least one of the pressure-receiving core 2 and the first and second non-pressure-receiving cores 3a, 3b, which suppresses the load F to be transmitted from the pressure-receiving core 2 to the first and second non-pressure-receiving cores 3a, 3b through the shield members 9.

In this embodiment, the receiving surface 21 of pressure-receiving core 2 is located on the opposite side to the mounting object 100, with respect to one of the two shield members 9, which is located on the opposite side to the mounting object 100. This suppresses the lowering of the accuracy of load detection due to the transmission of the load F to the first and second non-pressure-receiving cores 3a, 3b via the shield members 9.

Other configurations of this embodiment are similar to those of the first embodiment. The same symbols used in the second and subsequent embodiments as those used in the previous embodiments represent the same components, etc., as those in the previous embodiments, unless otherwise indicated.

Functions and Effects of the Second Embodiment

In this embodiment, the first and second detection coils 51, 52 and the first and second reference coils 71, 72 are covered from at least one side in the axial direction with a shield member 9 having a magnetic shielding effect. Therefore, magnetic flux in the vicinity of the load sensor 1 is restrained from entering the load sensor 1 and affecting load detection by the load sensor 1. Other actions and effects are the same as those of the first embodiment.

Third Embodiment

Figure 6:
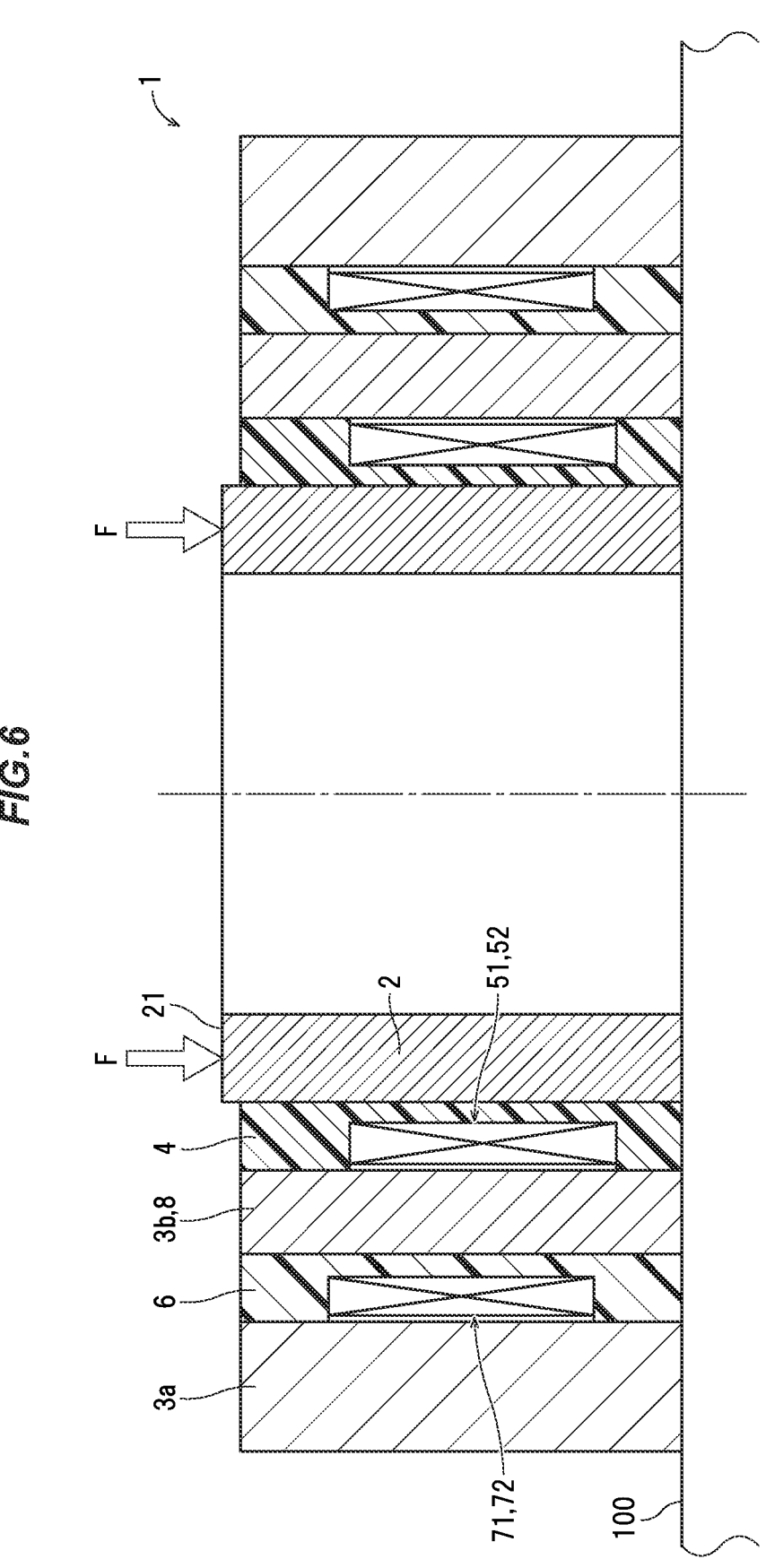
FIG. 6 is a cross-sectional view of the load sensor in the third embodiment.

FIG. 6 is a cross-sectional view of the load sensor 1 in this embodiment. In this embodiment, the radial arrangement of each component is opposite to that of the first embodiment. That is, this embodiment is provided with, in order from the inner periphery, the pressure-receiving core 2, the first and second detection coils 51, 52 wound around the detection bobbin 4, the second non-pressure-receiving core 3b constituting the yoke 8, the first and second reference coils 71, 72 wound around the reference bobbin 6, and the first non-pressure-receiving core 3a.

In this embodiment, the pressure-receiving core 2 is located at the innermost periphery of the parts constituting the load sensor 1, and the receiving surface 21 of the pressure-receiving core 2 is located on the opposite side to the mounting object 100 with respect to the other parts constituting the load sensor 1 when it is mounted on the mounting object 100. In this embodiment, the inductances of the first and second detection coils 51, 52 and the first and second reference coils 71, 72, located on the inner periphery side of the first and second detection coils 51, 52 and the first and second reference coils 71, 72, change due to the change in magnetic permeability of the pressure-receiving core 2. The rest is the same as in the first embodiment.

Functions and Effects of the Third Embodiment

In this embodiment, the pressure-receiving core 2 on which the load F acts is smaller in diameter than the first and second non-pressure-receiving cores 3a, 3b, which makes it easier to improve the durability of the pressure-receiving core 2 against the load F. Other functions and effects are the same as in the first embodiment.

Fourth Embodiment

Figure 7:
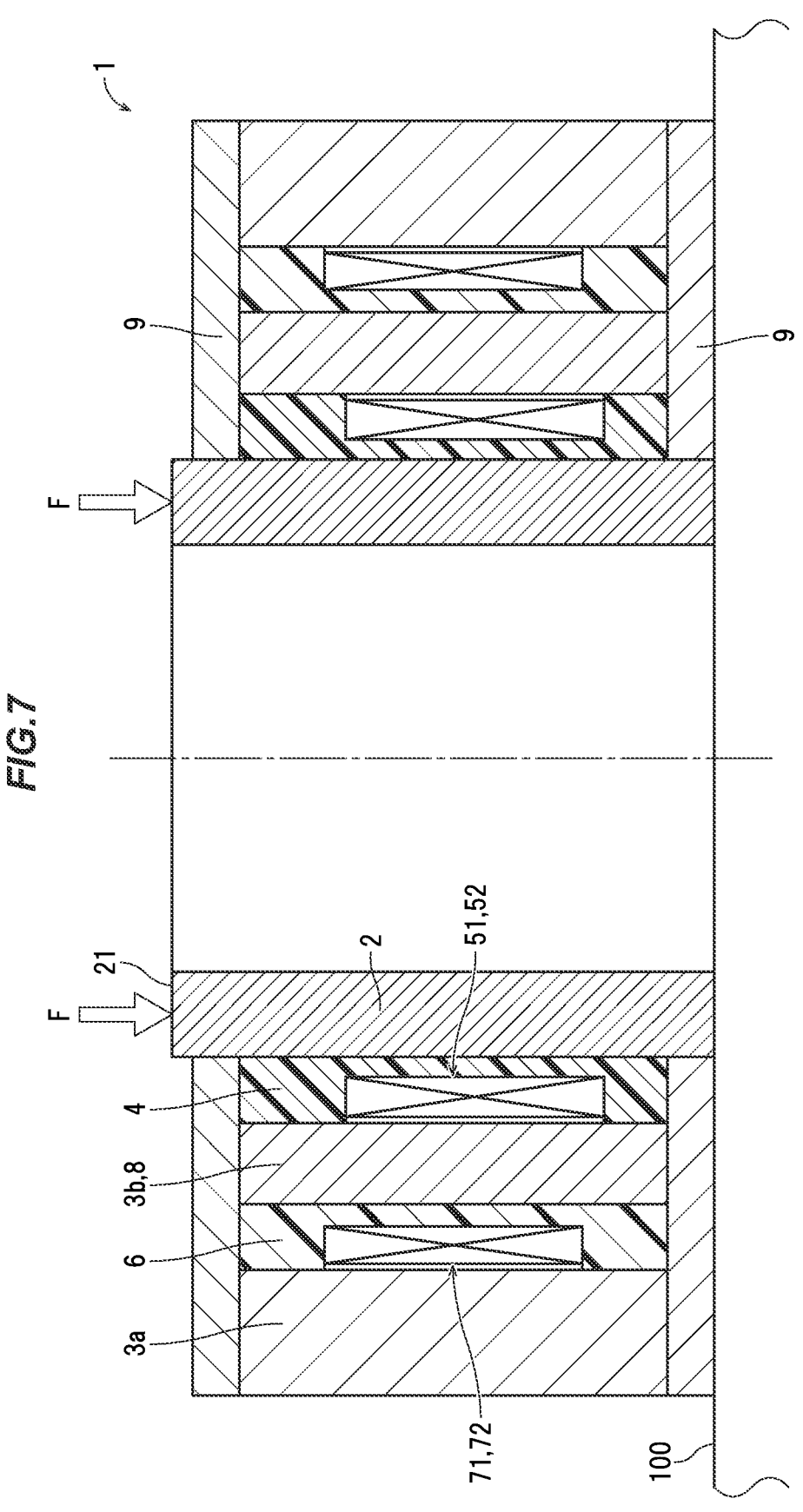
FIG. 7 is a cross-sectional view of the load sensor in the fourth embodiment.

FIG. 7 is a cross-sectional view of the load sensor 1 in this embodiment. This embodiment has the same basic structure as the third embodiment, but is designed to make it difficult for the external magnetic flux to enter the load sensor 1. In this embodiment sensor 1, the shield member 9 is added to at least one side of the first and second detection coils 51, 52 and the first and second reference coils 71, 72 in the axial direction.

In this embodiment sensor 1, the shield member 9 is arranged on at least one side of the first and second detection coils 51, 52 and the first and second reference coils 71, 72 in the axial direction. The material of the shield member 9 is the same as in the second embodiment.

In this embodiment, the two shield members 9 are provided, the two shield members 9 are each circularly formed and are externally fitted to both ends of the pressure-receiving core 2. Each shield member 9 is arranged to cover the detection bobbin 4, the yoke 8, the reference bobbin 6, and the first non-pressure-receiving core 3a from the axial direction. In this embodiment, an example is shown in which the shield members 9 are arranged on both sides of the first and second detection coils 51, 52 and the first and second reference coils 71, 72 in the axial direction, but for example, the shield members 9 can be arranged only on one side of the first and second detection coils 51, 52 and the first and second reference coils 71, 72 in the axial direction.

Each shield member 9 is unfastened to at least one of the pressure-receiving core 2 and the first and second non-pressure-receiving cores 3a, 3b, which makes it difficult for the load F to be transmitted from the pressure-receiving core 2 to the first and second non-pressure-receiving cores 3a, 3b through the shield members 9.

In this embodiment, the receiving surface 21 of the pressure-receiving core 2 is located on the opposite side to the mounting object 100, with respect to one of the two shield members 9, which is located on the opposite side to the mounting object 100. The other configuration of this embodiment is similar to that of the third embodiment.

Functions and Effects of the Fourth Embodiment

In this embodiment, the first and second detection coils 51, 52 and the first and second reference coils 71, 72 are covered from at least one side in the axial direction with the shield member 9 having a magnetic shielding effect. Therefore, magnetic flux in the vicinity of the load sensor 1 is restrained from entering the load sensor 1 and affecting load detection by the load sensor 1. Other functions and effects are the same as those of the third embodiment.

Other Embodiments

In each embodiment, an example of a bridge circuit using four coils is shown, but the present invention is not limited thereto. For example, a circuit in which each of the second reference coil 72 and the second detection coil 52 shown in FIG. 4 is replaced by an impedance element other than a coil (e.g., a resistance) may be employed. Each of the first detection coil 51 and the second reference coil 72 shown in FIG. 4 may be changed to an impedance element other than a coil. The impedance element other than the coil may be provided, for example, outside the load sensor 1 (e.g., in the voltage-measuring unit 16). In such a case, the load sensor 1 is configured with one detection coil and one reference coil. Various circuit configurations can be adopted for the load sensor 1, as long as the change in magnetic permeability in response to the magnitude of the load on the pressure-receiving core can be detected by the detection coil.

In each embodiment, shown is an example in which each of the pressure-receiving core, the non-pressure-receiving core, the reference bobbin, and the detection bobbin is formed in a cylindrical shape, but the present invention is not limited thereto, and other shapes, such as polygonal cylindrical shapes, may be employed.

In the first and second embodiments, the direction in which the load acts on the pressure-receiving core may be the radial direction. In this case, the permeability of the pressure-receiving core changes as the pressure-receiving core is compressed in the radial direction, and the magnitude of the load acting on the pressure-receiving core is detected according to this permeability change.

Summary of the Embodiments

Next, the technical concepts that can be grasped from the above embodiments will be described with the help of the codes, etc. in the embodiments. However, each character, etc. in the following description is not limited to the members, etc. specifically shown in the embodiments as the components in the claims.

According to the first feature, a load sensor 1 has a pressure-receiving core 2, 2a, 2b made of a magnetostrictive material on which a load F to be detected acts, a non-pressure-receiving core 3a, 3b, 3c made of a magnetic material concentrically arranged with the pressure-receiving core 2, 2a, 2b and on which the load F to be detected does not act, a detection coil 51, 52 that generates a magnetic flux φ1 that passes through the pressure-receiving core 2, 2a, 2b by energizing, and a reference coil 71, 72 that, when energized, generates a magnetic flux φ2 that does not pass through the pressure-receiving core 2, 2a, 2b but passes through the non-pressure-receiving core 3a, 3b, 3c.

According to the second feature, in the load sensor 1 as described in the first feature, at least one of the pressure-receiving core 2, 2a, 2b and the non-pressure-receiving core 3a, 3b, 3c is located between adjacent coils in a radial direction of a plurality of coils constituting the detection coil 51, 52 and the reference coil 71, 72 and has a yoke formed with both magnetic fluxes φ1, φ2 generated by energizing the adjacent coils respectively.

According to the third feature, in the load sensor 1 as described in the second feature, the magnetic permeability of the yoke 8 is not less than the magnetic permeability of the pressure-receiving core 2, 2a, 2b and the non-pressure-receiving core 3a, 3b, 3c, except the yoke (8).

According to the fourth feature, in the load sensor 1 as described in any one of the first to third features, the load F to be detected acts axially on a receiving surface 21 at one end of the pressure-receiving core 2, 2a, 2b in the axial direction.

According to the fifth feature, in the load sensor 1 as described in the fourth feature, the receiving surface 21 is located on an opposite side to a mounting object 100 with respect to the non-pressure-receiving core 3a, 3b, 3c when mounted on the mounting object 100.

According to the sixth feature, in the load sensor 1 as described in the fifth feature, an axial length of the pressure-receiving core 2, 2a, 2b is longer than an axial length of the non-pressure-receiving core 3a, 3b, 3c.

According to the seventh feature, in the load sensor 1 as described in any one of the first to sixth features, the detection coil 51, 52 and the reference coil 71, 72 are covered from at least one side in an axial direction by a shield member 9 having a magnetic shield effect.

According to the eight feature, in the load sensor 1 as described in any one of the first to seventh features, the detection coil 51, 52 comprises a first detection coil 51 and a second detection coil 52, and the reference coil 71, 72 comprises a first reference coil 71 and a second reference coil 72, the first detection coil 51 and the first reference coil 71 are connected in series, the second reference coil 72 and the second detection coil 52 are connected in series, the first reference coil 71 and the first detection coil 51 are connected in parallel with the second reference coil 72 and the second detection coil 52 to form a bridge circuit 10.

The above description of the embodiments of the invention is not intended to limit the invention in the claims. It should also be noted that not all of the combinations of features described in the embodiments are essential for the invention to solve the problems of the invention. In addition, the invention can be implemented with appropriate modifications without departing from its spirits.

The invention claimed is:

1. A load sensor, comprising:
   a pressure-receiving core made of a magnetostrictive material on which a load to be detected acts;
   a non-pressure-receiving core made of a magnetic material concentrically arranged with the pressure-receiving core and on which the load to be detected does not act;
   a detection coil that generates a magnetic flux that passes through the pressure-receiving core by energizing; and
   a reference coil that, when energized, generates a magnetic flux that does not pass through the pressure-receiving core but passes through the non-pressure-receiving core,
   wherein at least one of the pressure-receiving core and the non-pressure-receiving core is located between adjacent coils in a radial direction of a plurality of coils constituting the detection coil and the reference coil and has a yoke formed with both magnetic fluxes generated by energizing the adjacent coils respectively.

2. The load sensor according to claim 1, wherein a magnetic permeability of the yoke is not less than a magnetic permeability of the pressure-receiving core and the non-pressure-receiving core, except the yoke.

3. The load sensor according to claim 1, wherein the load to be detected acts axially on a receiving surface at one end of the pressure-receiving core in the axial direction.

4. The load sensor according to claim 3, wherein the receiving surface is located on an opposite side to a mounting object with respect to the non-pressure-receiving core when mounted on the mounting object.

5. The load sensor according to claim 4, wherein an axial length of the pressure-receiving core is longer than an axial length of the non-pressure-receiving core.

6. The load sensor according to claim 1, wherein the detection coil and the reference coil are covered from at least one side in an axial direction by a shield member having a magnetic shield effect.

7. The load sensor according to claim 1, wherein the detection coil comprises a first detection coil and a second detection coil, and the reference coil comprises a first reference coil and a second reference coil, the first detection coil and the first reference coil are connected in series, the second reference coil and the second detection coil are connected in series, the first reference coil and the first detection coil are connected in parallel with the second reference coil and the second detection coil to form a bridge circuit.

\* \* \* \* \*